UNITED STATES PATENT OFFICE.

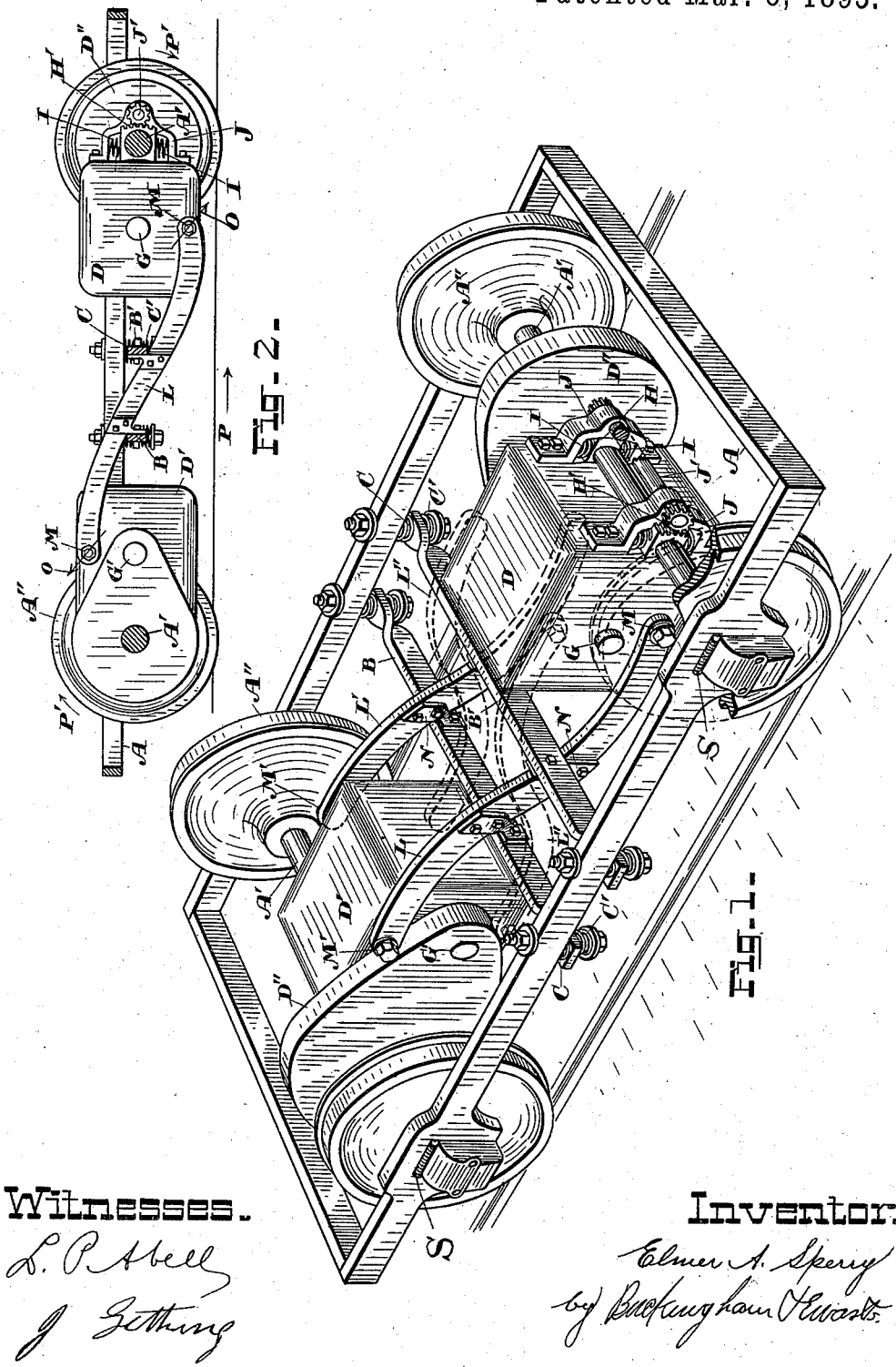

ELMER A. SPERRY, OF CLEVELAND, OHIO, ASSIGNOR TO THE SPERRY ELECTRIC RAILWAY COMPANY, OF OHIO.

MOUNTING FOR ELECTRIC MOTORS.

SPECIFICATION forming part of Letters Patent No. 535,304, dated March 5, 1895.

Application filed April 13, 1894. Serial No. 507,379. (No model.)

*To all whom it may concern:*

Be it known that I, ELMER A. SPERRY, a citizen of the United States, residing at Cleveland, in the county of Cuyahoga and State of Ohio, have invented a new and useful Improvement in Mountings for Electric Motors, of which the following is a specification.

My invention relates to a novel system of suspension for electric motors, especially when used in connection with railway trucks, and more especially where two such motors are used upon a single truck.

It consists in various details of construction tending to simplify and cheapen such mountings, increase the life and durability of the various parts and perform the various functions pointed out in the specification and illustrated in the accompanying drawings, in which—

Figure 1 is a perspective view of a bi-axled running gear for a motor car, showing motors of any of the well known types, and method of support. Fig. 2 shows a diagrammatic view with arrows indicating the strains, direction of rotation, &c.

Similar letters of reference indicate like parts throughout.

The truck, car body or other frame A mounted on the car axles A' provided with the wheels A'' supports the cross bars B B' preferably through resilient medium, which may either be single or double-acting, the latter being shown by springs C C' above and below the bars B. Rubber cushions may be used in place of these springs.

D D' indicate axle-mounted motors of any suitable type, those shown representing electric motors geared with spur gearing to the axles A' contained in the housings D'' D'', the motors having revolving parts indicated by G G'. These motors are mounted on the axle by journals H H', which may be solid with the motor, but preferably yieldingly connected therewith, and may be provided with cushions or springs I I. In case the journals are yieldingly mounted with reference to the motor they are preferably connected for simultaneous or equal movement by any of the well known methods, for instance one of the methods or devices shown in Patent No. 502,020, dated July 25, 1893, namely, the rack and pinion engaging at J J and connected by the shaft J'. It is evident that were the journals H H' the only support employed for the motor, especially where its center of gravity shall pass through a vertical line to one side of the axle, it would swing down and about the axle A'; and also when under the effort of propelling such axle, necessitating an additional support, which may be provided by the bars L L' attached preferably by a pivot or a yielding joint at any suitable point upon the motor or motors such as M M', for example a point substantially in a vertical line with its center of gravity, or a point in line at a sensible angle about the axle-center with a line connecting the two axles. However, these conditions are not all necessary for performing the function desired. The bars L are attached to and preferably supported by the transverse bars B B' and may extend to either of the motors, forming practically a union between the two, and when so doing and conforming to the above specification as to attachment to the motors the bars should attach to one motor on the opposite side of the center of gravity from its point of attachment to the other.

It will readily be understood that variations from the plan shown may be made; the dotted lines L'' for instance indicating that the bars L l' may be attached from either side of the center of gravity of the motors. It will also be seen that the frame A may be employed as a support, the arms L L' being either attached directly thereto or through a resilient medium, it being understood that the frame A sustains the usual elastic connection with the axles located at any suitable point, as for instance points above the car axles or their journals indicated at S S, so that in any event there is an elastic medium or support as between the motor and the axle other than, and in addition to, the springs I I which are directly between the axle-mounted boxes H and the motor.

The use and operation of the invention will readily be understood from the drawings, and will be seen from the diagram shown in Fig. 2. The arrows O O' indicate the direction of the effort at the points M M' of the attachment of the bars L, and inasmuch as it is supposed that the motors are practically equal in their efforts, the strains at these points are equal and opposite, the truck being supposed to be moving in the direction of the arrow P. Were it moving in the opposite direction the strains at the arrows O O' would be opposite and point toward each other, but the strains would still be equal and opposite as above described. In this event the wheels would turn in the opposite direction to the arrows P' P'. By mounting the motors in this manner the heavy strains on the springs C C' and cross bars B B' are greatly lessened, especially when compared with bars that couple the motors both upon the same side, say above their center of gravity, which is taken as point G G' upon such motors. The yielding joint between the journals H H' and the axle A' takes all the weight, and therefore the inertia of the mass from the axle, tending thereby to lessen its molecular concussion and all the vibratory strains. The sledge hammer blows upon the rail joints, due to the mass of the motor, are also entirely avoided. Many other advantages also exist, especially the entire relief of shock to the more delicate parts of the motor such as insulation, commutator, &c.

While it is designed to use all of the above features in connection with one another, yet it is obvious that some may be used without the others, and the invention extends to such use.

In connection with this invention I claim—

1. In a power transmission for vehicles, a bi-axled running gear, a motor connected with each axle and extending therefrom in such a manner that its center of gravity shall pass through a line at one side of the axle, an arm extending from one motor to the other pivotally attached thereto at a point in substantially a vertical line above the said center of gravity upon one motor, and below such center of gravity upon the other motor.

2. In a power transmission for vehicles, a bi-axled running gear, a motor connected with each axle and extending therefrom in such a manner that its center of gravity shall pass through a vertical line at one side of the axle, an arm extending from one motor to the other attached at points upon one motor above and the other below a line connecting the axle-centers.

3. In a power transmission for vehicles, a bi-axled running gear, motors connected with each axle and extending therefrom toward each other in such a manner that the center of gravity of each shall pass through a vertical line to one side of the axle, an arm extending from one motor to the other attached to the motors at points on opposite sides of the horizontal plane respectively of their centers of gravity.

4. In a power transmission for vehicles, a bi-axled running gear, a motor connected with each axle and extending therefrom in such a manner that its center of gravity shall pass through a vertical line at one side of the axle, an arm extending from one motor to the other pivotally attached to the motors at points on the opposite sides of the horizontal plane of the center of gravity of each motor respectively.

5. In a bi-axled truck, consisting in part of an axle-mounted frame, a motor connected with each axle and extending therefrom in such a manner that its center of gravity shall pass through a vertical line at one side of such axle, an arm extending from one motor to the other attached thereto at points as M M', in combination with an elastic medium between said points M M' and the truck frame.

6. In a power transmission for vehicles, a bi-axled running gear, a motor mounted upon each axle through an elastic connection and extending therefrom in such a manner that its center of gravity shall pass through a vertical line at one side of the axle, an arm extending from one motor to the other attached to the motors at points on the opposite sides respectively of their centers of gravity.

7. In a power transmission for vehicles, a bi-axled running gear, a motor mounted upon each axle by journals, resilient medium between the journals and the motor, the motor mounted in such a manner that its center of gravity shall pass through a vertical line at one side of the axle, an arm extending from one motor to the other, attached thereto at points on opposite sides respectively of their centers of gravity.

8. In a power transmission for vehicles, a bi-axled running gear, a motor mounted upon each axle by journals, resilient medium between the journals and the motor, and an equalizing device between the journals, the motors extending from the axles in such a manner that their centers of gravity shall pass through a vertical line at one side of the axle, an arm extending from one motor to the other attached thereto at points on opposite sides respectively of their centers of gravity.

9. In a bi-axled truck, consisting in part of an axle-mounted frame, a motor connected with each axle and extending therefrom in such a manner that its center of gravity shall pass through a vertical line at one side of such axle, arms extending from one motor to the other attached thereto at points on opposite sides respectively of their centers of gravity, transverse bars within the truck attached to said arms, in combination with a resilient medium between the transverse bars and the truck frame.

ELMER A. SPERRY.

Witnesses:
M. NIELSON,
L. P. ABELL.